United States Patent

Ulics

[15] 3,707,082
[45] Dec. 26, 1972

[54] BELLOWS FLEXIBLE JOINT
[72] Inventor: George Ulics, Plymouth, Mich.
[73] Assignee: Ford Motor Company, Dearborn, Mich.
[22] Filed: Sept. 22, 1970
[21] Appl. No.: 74,431

[52] U.S. Cl. .................................................64/11 B
[51] Int. Cl...............................................F16d 3/28
[58] Field of Search...................................64/11, 32

[56] References Cited

FOREIGN PATENTS OR APPLICATIONS 763,089   12/1956   Great Britain.............................64/11
212,124   3/1924   Great Britain.............................64/11

*Primary Examiner*—Edward G. Favors
*Attorney*—John R. Faulkner and Roger E. Erickson

[57] ABSTRACT

A flexible joint for transferring torque including a metal bellows member interconnecting a pair of rotatable end members. The radii of curvature of the axially extreme convolutions adjacent each of the end members are enlarged in magnitude relative to the radii of the middle convolution or convolutions.

3 Claims, 3 Drawing Figures

PATENTED DEC 26 1972 3,707,082

INVENTOR
GEORGE ULICS
BY John R. Faulkner
Roger E. Erickson
ATTORNEYS 3,707,082

BELLOWS FLEXIBLE JOINT

BACKGROUND AND SUMMARY OF THE INVENTION

A universal joint commonly used to transmit motion between two angularly misaligned rotating shafts is the simple Cardan joint. There are, however, many applications in which a Cardan joint is not well suited. One such application is where the inherent non-uniform motion transmission characteristics of a Cardan joint provide unacceptable velocity variations between the input and output shafts. Another such application is where the weight or size of the joint is of primary importance. Many essentially constant velocity joints are presently available, but are often too cumbersome or too expensive for many applications where such constant velocity is desired.

It has been found that a cylindrical bellows positioned between two end members provide a substantially constant velocity flexible coupling for rotating shafts at relatively low torque loads and low speeds. See, for example, U.S. Pat. No. 3,232,076 granted Feb. 1, 1966 to Sundt. Recently, substantial advances have been made in the utilization of bellows for carrying significantly higher torque loads at high speeds and at essentially constant velocities. See, for example, U.S. Pat. No. 3,621,674 granted Nov. 23, 1971 to Ulics and Wheatley and No. 3,623,339 granted Nov. 30, 1971 to Muller.

It has been found that a simple uniform bellows, such as that shown in U.S. Pat. No. 3,232,076 granted Feb. 1, 1966 to Sundt, experiences stress loads which are minimum at its middle convolution and maximum at its axially extreme convolutions. When such a bellows is stressed repeatedly to the point of failure by a dynamic torsional load, the failure generally occurs at one of the end convolutions. This invention provides a bellows construction in which the torque capacity and overall durability of a bellows assembly may be significantly increased. Further this invention provides a bellows construction in which high relative stress concentrations in certain bellows convolutions have been substantially eliminated.

A flexible torque-transfer joint constructed in accordance with this invention comprises a pair of rotatable end members interconnected by a generally cylindrical bellows, which in turn has a plurality of axially disposed annular convolutions. The axially extreme convolutions of the bellows have enlarged radii of curvature relative to the axially middle convolution or intermediate convolutions.

DETAILED DESCRIPTION OF A PREFERRED EMBODIMENT

Figure 1:
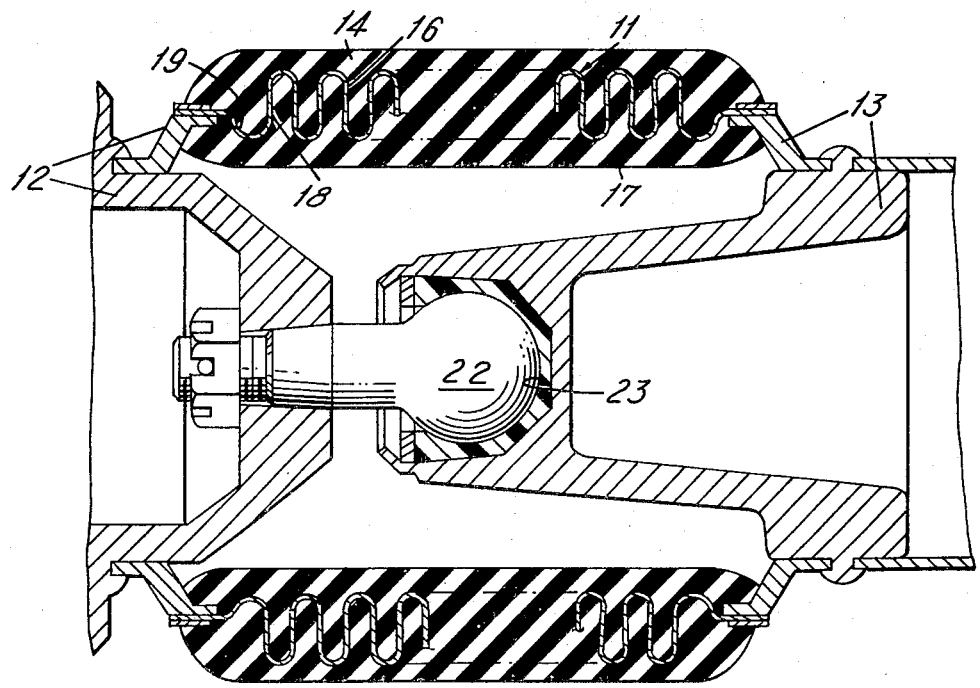
FIG. 1 shows a cross-sectional view of a bellows flexible joint embodying the invention.
Figure 2:
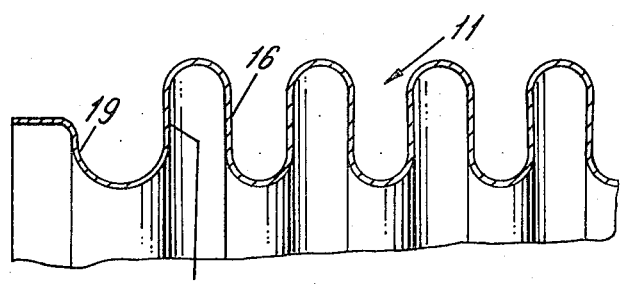
FIG. 2 shows a cross-sectional view of a portion of an axially extreme portion of the wall of a bellows flexible joint.

In the preferred embodiment, a metal cylindrical bellows 11 is fastened to and innerconnects a pair of rotatable annular end members 12 and 13 as shown in FIG. 1 of the drawing. The bellows may be constructed of stainless steel of a single or uniform thickness depending upon the torque load to be carried. Bellows 11 may be formed from single layer metal stock as illustrated in FIG. 1 or, alternatively, of multilayer stock which is generally capable of accommodating higher torque loads and greater operating angles. Elastomeric material 14 is received about the cylindrical bellows and is molded into each annular groove or convolution 16. Similarly, elastomeric material 17 is positioned within the radially inner surface of the cylindrical bellows and into the radially inwardly opening grooves or convolutions 18 of the bellows. The bellows wall is thus sandwiched between two layers of elastomeric material. The elastomeric material increases the torsional stiffness of the joint assembly while maintaining an acceptable level of bending stiffness.

The radius of curvature of each of the intermediate convolutions 16 is essentially identical in magnitude. The radius of curvature of each of the axially extreme convolution 19 and 21 is approximately twice that of the intermediate radii. This has the effect of distributing the axially extreme bending stresses over a larger area and eliminating the tendency for initial failure in the area of the first convolution.

A ball and socket centering device 22 and 23 may be provided to fix the point of intersection of the rotatable end members 12 and 13. When such a centering device is provided, the ball member 22 is rigidly fixed to one end member and the socket member 23 is rigidly fixed to the other end member. The point of relative rotation is preferable at the axial midpoint of the cylindrical bellows.

Figure 3:
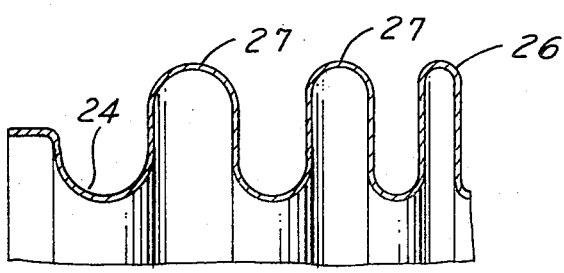
FIG. 3 shows a cross-sectional view of a portion of an alternate bellows construction.

FIG. 3 of the drawings illustrates an alternate embodiment of the invention in which the end convolutions 24 have a maximum radius, the axially middle convolution 26 has a minimum radius, and the intermediate convolutions 27 have increasing radii from the middle of the bellows to the respective ends. In this embodiment, the radius of each convolution may be individually tailored to substantially equalize stresses in each of the convolutions.

Modifications and alterations may occur to those skilled in the art which are included within the scope of the following claims.

I claim:

1. A flexible torque transfer assembly comprising:

a rotatable driving member and a rotatable driven member, flexible means interconnecting said driving member and said driven member constructed to transmit torque and rotary motion between said members, said flexible means permitting angular displacement of the driven member relative to the driving member from an axially aligned position to various positions of axial misalignment, said flexible means including a cylindrical bellows interconnecting and secured to said driving member and said driven member, said bellows member including a plurality of axially disposed annular convolutions, said bellows member being shaped from stock having a substantially uniform thickness, means to reduce the magnitude of stresses in axially extreme convolutions of said bellows member comprising enlarged radii of curvature of said axially extreme convolutions relative to an axially intermediate convolution.

2. A flexible torque transfer assembly comprising:

a rotatable driving member and a rotatable driven member, flexible means interconnecting said driving member and said driven member constructed to transmit torque and rotary motion between said members, said flexible means permitting angular displacement of the driven member relative to the driving member from an axially aligned position to various positions of axial misalignment, said flexible means including a cylindrical bellows interconnecting and secured to said driving member and said driven member, said bellows member including a plurality of axially disposed annular convolutions, said bellows member being shaped from stock having a substantially uniform thickness, said bellows member including a plurality of axially intermediate convolutions each having a substantially identical radius of curvature, means to reduce the magnitude of stresses in axially extreme convolutions of said bellows member comprising enlarged radii of curvature of said axially extreme convolutions relative to an axially intermediate convolution.

3. A flexible torque transfer assembly comprising:

a rotatable driving member and a rotatable driven member, flexible means interconnecting said driving member and said driven member constructed to transmit torque and rotary motion between said members, said flexible means permitting angular displacement of the driven member relative to the driving member from an axially aligned position to various positions of axial misalignment, said flexible means including a cylindrical bellows interconnecting and secured to said driving member and said driven member, said bellows member including a plurality of axially disposed annular convolutions, said bellows member being shaped from stock having a substantially uniform thickness, means to reduce the magnitude of stresses in axially extreme convolutions of said bellows member and to substantially equalize the magnitude of stresses within each of the convolutions comprising maximum radii of curvature of said convolutions immediately adjacent each end member and consecutively decreasing radii of curvature to the midpoint of the bellows axis.

* * * * *